United States Patent
He et al.

(10) Patent No.: US 12,452,026 B2
(45) Date of Patent: Oct. 21, 2025

(54) DETERMINING INFORMATION FOR BEAM FORMATION ACROSS COMPONENT CARRIERS

(71) Applicant: ZTE CORPORATION, Guangdong (CN)

(72) Inventors: Zhen He, Shenzhen (CN); Bo Gao, Shenzhen (CN); Ke Yao, Shenzhen (CN); Zhaohua Lu, Shenzhen (CN); Wenjun Yan, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 356 days.

(21) Appl. No.: 17/870,750

(22) Filed: Jul. 21, 2022

(65) Prior Publication Data
US 2022/0368509 A1 Nov. 17, 2022

Related U.S. Application Data

(63) Continuation of application No. PCT/CN2020/119290, filed on Sep. 30, 2020.

(51) Int. Cl.
*H04L 5/00* (2006.01)
*H04W 52/18* (2009.01)

(52) U.S. Cl.
CPC .......... *H04L 5/0098* (2013.01); *H04W 52/18* (2013.01)

(58) Field of Classification Search
CPC ... H04B 7/0617; H04B 7/06952; H04L 5/001; H04L 5/0023; H04L 5/0048
See application file for complete search history.

(56) References Cited

U.S. PATENT DOCUMENTS

| | | | |
|---|---|---|---|
| 2019/0281588 A1* | 9/2019 | Zhang | .................. H04B 7/0617 |
| 2020/0275382 A1 | 8/2020 | Liu et al. | |
| 2020/0287610 A1 | 9/2020 | Zhou et al. | |
| 2021/0153209 A1* | 5/2021 | Guan | .................... H04L 5/0037 |
| 2022/0279460 A1* | 9/2022 | Zhang | .................. H04W 16/28 |
| 2022/0330163 A1* | 10/2022 | Liu | ..................... H04W 52/146 |
| 2023/0155753 A1* | 5/2023 | Zhou | ..................... H04L 5/0048 |
| | | | 370/329 |

FOREIGN PATENT DOCUMENTS

| | | |
|---|---|---|
| CN | 112399597 A | 2/2021 |
| WO | WO-2018/209179 A1 | 11/2018 |
| WO | WO-2018/210241 A1 | 11/2018 |
| WO | WO-2020/029725 A1 | 2/2020 |

(Continued)

OTHER PUBLICATIONS

Huawei et al.: "Remaining issues on multi-beam enhancements in R16" 3GPP TSG RAN WG1 Meeting #100bis-e; R1-2001564; Apr. 30, 2020; e-Meeting (14 pages).

(Continued)

*Primary Examiner* — Zhensheng Zhang
(74) *Attorney, Agent, or Firm* — Foley & Lardner LLP

(57) ABSTRACT

Presented are systems, methods, apparatuses, or computer-readable media for reference signaling configuration. A wireless communication device may receive, from a wireless communication node, an indication of a beam state of a first component carrier (CC). The wireless communication device may determine information of a second CC according to the beam state of the first CC.

12 Claims, 10 Drawing Sheets

(56) References Cited

FOREIGN PATENT DOCUMENTS

WO     WO-2021/109449 A1     6/2021

OTHER PUBLICATIONS

International Search Report and Written Opinion for PCT Appl. No. PCT/CN2020/119290, mailed Jun. 24, 2021 (7 pages).
Asia Pacific Telecom, "Discussion on Enhancements for Multi-beam Operation" 3GPP TSG RAN WG1 #102-e, R1-2006636, Aug. 17, 2020, e-Meeting (5 pages).
CATT, "Discussion on enhancement on multi-beam operation" 3GPP TSG RAN WG1 #102-e, R1-2005683, Aug. 17, 2020, e-Meeting (5 pages).
CMCC, "Enhancements on multi-beam operation" 3GPP TSG RAN WG1 #102-e, R1-2006200, Aug. 17, 2020, e-Meeting (5 pages).
Extended European Search Report on EP Appln No. 20955661.2, dated Oct. 19, 2023 (16 pages).
Intel Corporation, "Enhancements on Multi-Beam Operation" 3GPP TSG RAN WG1 #102, R1-2006950, Aug. 18, 2020, e-Meeting (17 pages).
Interdigital Inc., "Enhancements on Multi-beam Operation" 3GPP TSG RAN WG1 #102-e, R1-2005482, Aug. 17, 2020, e-Meeting (6 pages).
Lenovo et al., "Enhancements on Multi-beam Operation" 3GPP TSG RAN WG1#102-e, R1-2005820, Aug. 17, 2020, e-Meeting (6 pages).
Mediatek Inc., "Enhancement on multi-beam operation" 3GPP TSG RAN WG1 #102-e, R1-2005619, Aug. 17, 2020, e-Meeting (7 pages).
Nokia et al., "Enhancements on Multi-beam Operation" 3GPP TSG RAN WG1 #102-e, R1-2006843, Aug. 17, 2020, e-Meeting (20 pages).
NTT Docomo Inc., "Discussion on beam management for MTRP" 3GPP TSG RAN WG1-e, R1-2006721, Aug. 17, 2020, e-Meeting (5 pages).
OPPO, "Enhancements on Multi-Beam Operation" 3GPP TSG RAN WG1 #102-e, R1-2005983, Aug. 17, 2020, e-Meeting (4 pages).
Sony, "Considerations on the enhancement of multi-beam operation" 3GPP TSG RAN WG1#102e, R1-2005560, Aug. 17, 2020, e-Meeting (10 pages).
Vivo, "Discussion on multi-beam enhancement" 3GPP TSG RAN WG1 #102-e, R1-2005363, Aug. 17, 2020, e-Meeting (21 pages).
Communication pursuant to Article 94(3) EPC for EP Appl. No. 20955661.2, dated Sep. 9, 2024 (12 pages).
LG Electronics, "Feature lead summary#3 of Enhancements on Multi-beam Operations", 3GPP TSG RAN WG1 Meeting #99, R1-1913422, Nov. 22, 2019, Reno, USA (39 pages).

\* cited by examiner

DETERMINING INFORMATION FOR BEAM FORMATION ACROSS COMPONENT CARRIERS

CROSS-REFERENCE TO RELATED APPLICATION

This application claims the benefit of priority under 35 U.S.C. § 120 as a continuation of PCT Patent Application No. PCT/CN2020/119290, filed on Sep. 30, 2020, the disclosure of which is incorporated herein by reference in its entirety.

TECHNICAL FIELD

The disclosure relates generally to wireless communications, including but not limited to systems and methods for determining information of component carriers (CCs).

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, a method, an apparatus, or a computer-readable medium. A wireless communication device may receive, from a wireless communication node, an indication of a beam state of a first component carrier (CC). The wireless communication device may determine information of a second CC according to the beam state of the first CC.

In some embodiments, the first CC and the second CC may be a same CC or different CCs. In some embodiments, the information of the second CC may include at least one of: a sounding reference signal (SRS) resource, a SRS resource set, a path-loss reference signal (PL-RS), a p0, an alpha, or a closed loop. In some embodiments, the wireless communication device may determine information of an uplink signal in the second CC according to the information of the second CC, wherein the information of the uplink signal includes at least one of: port information or power control information. The uplink signal may include at least one of a physical uplink shared channel (PUSCH), a physical uplink control channel (PUCCH), or a sounding reference signal (SRS).

In some embodiments, the first CC belongs to a first CC group, and the second CC may belong to a second CC group which is same as or different from the first CC group. In some embodiments, the first CC comprises at least one of: a primary cell (PCell), a CC having a lowest or highest CC index in a CC group, or a CC configured via an radio resource control (RRC) signaling.

In some embodiments, the beam state of the first CC may include an only activated beam state, an (e.g., predefined) M-th beam state from N activated beam states, or (e.g., predefined) P beam states out of the N activated beam states, where M, N and P are integer values. In some embodiments, the beam state of the first CC may be activated via a medium access control control element (MAC CE) or downlink control information (DCI) signaling.

In some embodiments, the wireless communication device may determine the information of the second CC according to information associated with the beam state of the first CC. The information associated with the beam state of the first CC may include at least one of: a path-loss reference signal (PL-RS), a PL-RS identifier (ID), a first offset, a second offset, a SRS resource ID, a SRS resource set ID, a third offset, a p0, a p0 ID, an alpha, or a closed loop.

In some embodiments, the wireless communication device may determine the information of the second CC of a first information type, according to information of the first CC of the first information type associated with the beam state of the first CC, wherein the first information type includes at least one of: a sounding reference signal (SRS) resource, a SRS resource set, a path-loss reference signal (PL-RS), a p0, an alpha, or a closed loop.

In some embodiments, the wireless communication device may determine information of a second information type associated with the information of the first information type of the second CC, according to information of the second information type associated with the information of the first information type of the first CC. The information of the second information type may include at least one of: an identifier (ID) of the SRS resource or the SRS resource set, the PL-RS, an ID of the PL-RS, the P0, the alpha, or the closed loop.

In some embodiments, a usage of the SRS resource or the SRS resource set may include at least one of: non-codebook (NCB), codebook (CB) or antenna switching. In some embodiments, the uplink signal may include at least one of a physical uplink shared channel (PUSCH), a physical uplink control channel (PUCCH), or a sounding reference signal (SRS).

At least one aspect is directed to a system, a method, an apparatus, or a computer-readable medium. A wireless communication node may transmit, to a wireless communication device, an indication of a beam state of a first component carrier (CC). The wireless communication node may cause the wireless communication device to determine information of a second CC according to the beam state of the first CC.

In some embodiments, the first CC and the second CC may be a same CC or different CCs. In some embodiments, the information of the second CC may include at least one of: a sounding reference signal (SRS) resource, a SRS resource set, a path-loss reference signal (PL-RS), a p0, an alpha, or a closed loop. In some embodiments, the wireless communication node may cause the wireless communication device to determine information of an uplink signal in the second CC according to the information of the second CC, wherein the information of the uplink signal includes at least one of: port information or power control information. The uplink signal may include at least one of a physical uplink shared channel (PUSCH), a physical uplink control channel (PUCCH), or a sounding reference signal (SRS).

In some embodiments, the first CC belongs to a first CC group, and the second CC may belong to a second CC group which is same as or different from the first CC group. In some embodiments, the first CC comprises at least one of: a primary cell (PCell), a CC having a lowest or highest CC index in a CC group, or a CC configured via an radio resource control (RRC) signaling.

In some embodiments, the beam state of the first CC may include an only activated beam state, an M-th beam state from N activated beam states, or P beam states out of the N activated beam states, where M, N and P are integer values. In some embodiments, the beam state of the first CC may be activated via a medium access control control element (MAC CE) or downlink control information (DCI) signaling.

In some embodiments, the wireless communication node may cause the wireless communication device to determine the information of the second CC according to information associated with the beam state of the first CC. The information associated with the beam state of the first CC may include at least one of: a path-loss reference signal (PL-RS), a PL-RS identifier (ID), a first offset, a second offset, a SRS resource ID, a SRS resource set ID, a third offset, a p0, a p0 ID, an alpha, or a closed loop.

In some embodiments, the wireless communication node may cause the wireless communication device to determine the information of the second CC of a first information type, according to information of the first CC of the first information type associated with the beam state of the first CC, wherein the first information type includes at least one of: a sounding reference signal (SRS) resource, a SRS resource set, a path-loss reference signal (PL-RS), a p0, an alpha, or a closed loop.

In some embodiments, the wireless communication node may cause the wireless communication device to determine information of a second information type associated with the information of the first information type of the second CC, according to information of the second information type associated with the information of the first information type of the first CC. The information of the second type may include at least one of: an identifier (ID) of the SRS resource or the SRS resource set, the PL-RS, an ID of the PL-RS, the P0, the alpha, or the closed loop.

In some embodiments, a usage of the SRS resource or the SRS resource set may include at least one of: non-codebook (NCB), codebook (CB) or antenna switching. In some embodiments, the uplink signal may include at least one of a physical uplink shared channel (PUSCH), a physical uplink control channel (PUCCH), or a sounding reference signal (SRS).

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

The following acronyms are used throughout the present disclosure:

| Acronym | Full Name |
|---------|-----------|
| 3GPP | 3rd Generation Partnership Project |
| 5G | 5th Generation Mobile Networks |
| 5G-AN | 5G Access Network |
| 5G gNB | Next Generation NodeB |
| BWP | Bandwidth Part |
| CA | Carrier Aggregation |
| CC | Carrier Component |
| CE | Control Element |
| CSI-RS | Channel State Information, Reference Signal |
| DCI | Downlink Control Information |
| DL | Down Link or Downlink |
| MAC-CE | Media Access Control Control Element |
| NG | Next Generation |
| NW | Network |
| OFDM | Orthogonal Frequency-Division Multiplexing |
| OFDMA | Orthogonal Frequency-Division Multiple Access |
| PC | Power Control |
| PDCCH | Physical Downlink Control Channel |
| PDCP | Packet Data Convergence Protocol |
| PDSCH | Physical Downlink Shared Channel |
| PHY | Physical Layer |
| PC | Path loss |
| PUCCH | Physical Uplink Control Channel |
| QCL | Quasi Co-Location |
| RA | Random Access |
| RI | Rank Indicator |
| RLC | Radio Link Control |
| RS | Reference Signal |
| RRC | Radio Resource Control |
| SRS | Sounding Reference Signal |
| SSB | Synchronization Signal Block |
| TB | Transport Block |
| TCI | Transmission Configuration Indicator |
| TPMI | Transmitted Precoding Matrix Indicator |
| UE | User Equipment |
| UL | Up Link or Uplink |

1. Mobile Communication Technology and Environment

Figure 1:
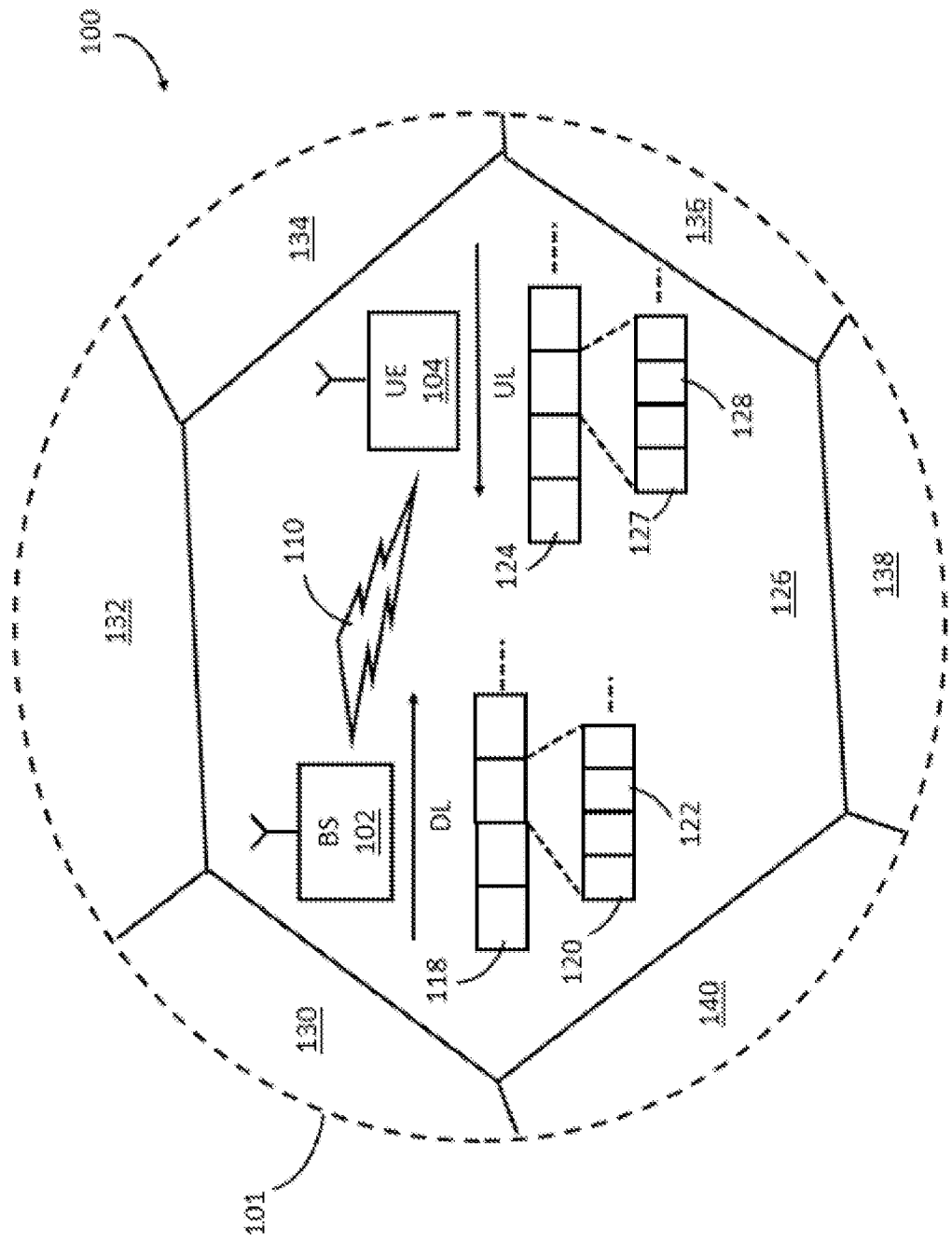
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
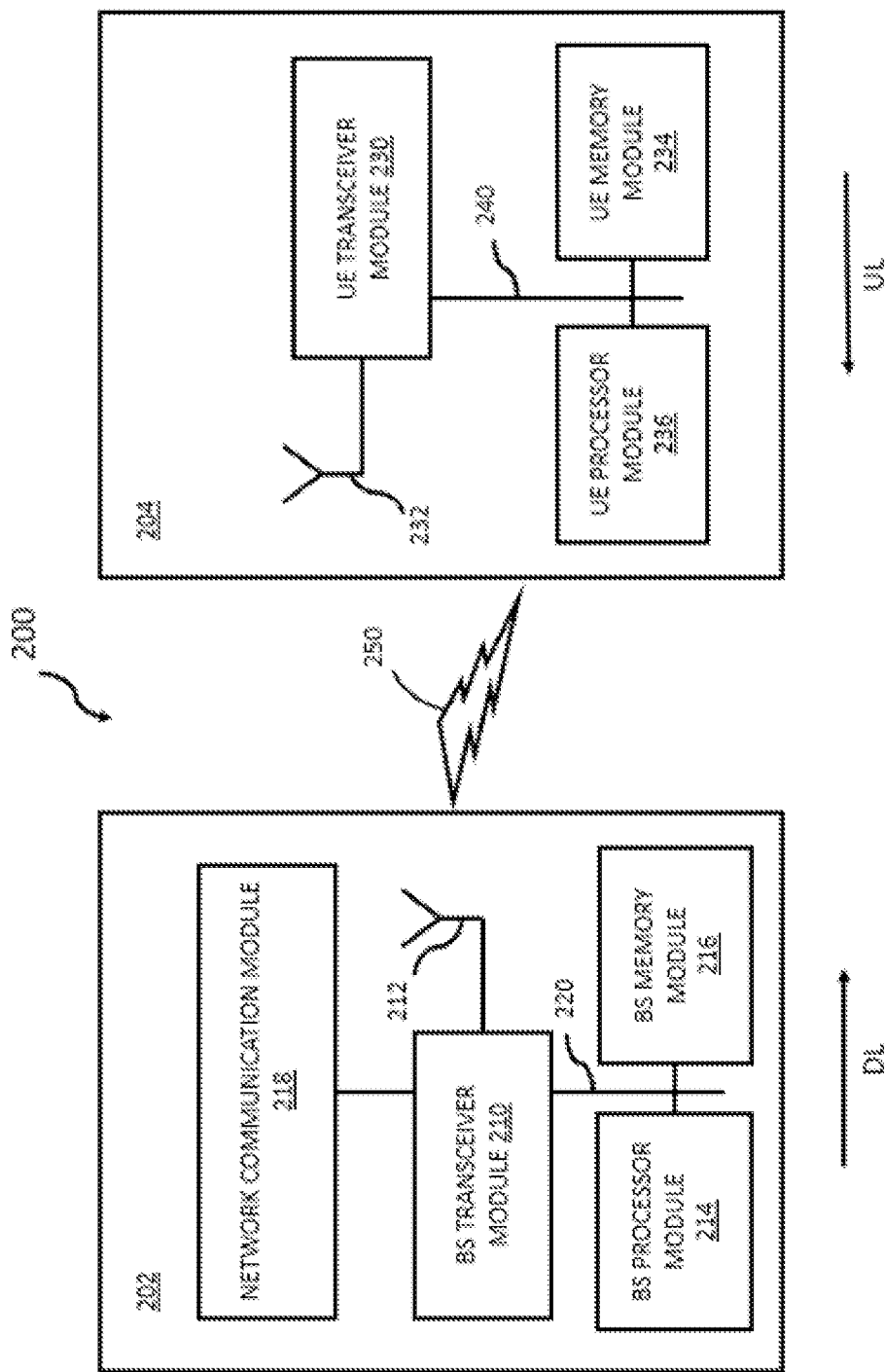
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods for Determining Information for Beam Forming Across Component Carriers In carrier aggregation (CA) deployments, the user equipment (UE) supporting a beam correspondence may be likely to be supported in the future, as the gNodeB (sometimes referred to as wireless communication node) can update the beams of all uplink (UL) and downlink (DL) channels and signals in multiple carrier components (CCs) simultaneously by activating beam states in one predefined CC. From the updating of the beams, the UE (sometimes referred to as wireless communication device) can determine beam information across CCs. For UL channels or signals, in addition to the beams, the power control (PC) information and antenna port information may also be updated. One issue with updating, however, may be the lack of an effective approach for updating the PC information and the port information across multiple CCs.

In 5G NR, the UE can be combined with multiple carrier components (CCs) in carrier aggregation (CA) deployment. Considering that multiple CCs in the same frequency band may have the same or similar large scale characteristics (e.g., Doppler shift, Doppler spread, average delay, delay spread, and spatial filter), simultaneous update of beam state of channels or signals in multiple CCs can be supported. Specifically, these CCs can be configured in the same CC group. One activation command (e.g., MAC-CE) may be used to activate an index (or indexes) of beam state for specific channels or signals in all CCs in the CC group.

In order to reduce overhead of RRC signaling, multiple CCs may share the same beam state pool, such that one beam state pool (also referred herein as a common beam state pool) may be used to support. Specifically, the beam state pool configured in a predefined CC can be reused as the common beam state pool. Cross CC methods may be used to obtain beam information from other CCs in accordance to the beam state in the predefined CC. Leveraging other CCs in this manner may save overhead of signaling, especially for media access control control element (MAC-CE).

Under some approaches, cross CC methods may be based on the acquisition of beam information. For the UE supporting DL/UL beam correspondence, the beam state can be used to indicate beam information of DL and UL channel or signal simultaneously. The beam state in this context can be referred as the unified beam state. For DL channel or signal, the above cross CC methods may be suitable. However, UL channel or signal, PC information and port information (except for beam information) may also be available, and beam information of PUSCH may be ignored. In addition, multiple RRC signaling may be used to configure respective beam state pool for each CC, though these CCs belongs to the same group.

In the context of the present disclosure, a beam state may be equivalent to or may include quasi-co-location (QCL) state, QCL assumption, reference signal (RS), transmission configuration indicator (TCI) state, or spatial relation information (spatialRelationInfo), among others. In particular, QCL or QCL assumption may include at least one of the following aspect or combination: Doppler spread, Doppler shift, delay spread, average delay, average gain, and Spatial parameter, among others. Port information may include at least one of an antenna port or a set of antenna port applied to transmit UL channel or signal (e.g., PUSCH), an rank indicator (RI), and a transmitted precoding matrix indicator (TPMI), among others.

TCI state may include one or more reference RSs (also called as QCL RSs) and their corresponding QCL type parameters. QCL type parameters may include at least one of the following aspect or combination: Doppler spread, Doppler shift, delay spread, average delay, average gain, and Spatial filter or Spatial parameter, among others. For example, QCL type include QCL-TypeD used to represent the same or quasi-co spatial filter between targeted "RS or channel" and the one or more reference QCL-TypeD RSs. In other words, the spatial filter can also be called a beam. The partial relation information may include one or more reference RSs (also called spatial RS) used to represent the same or quasi-co spatial relation between targeted RS or channel, and the one or more reference RSs, among others. In other words, the spatial relation can also be called a beam.

Furthermore, the carrier component (CC) can be equivalent to a serving cell or bandwidth part (BWP) of the CC. A CC group may be equivalent to or may include a group of one or more CCs, and may be configured by a higher layer configuration (e.g., Radio Resource Control (RRC) signaling). Power control (PC) information may include at least one of pathloss (PL), open loop configuration, and closed loop configuration, among others. The PL may be calculated by using a PL reference signal (RS), such as a periodic CSI-RS or a synchronization signal block (SSB). An open loop configuration may include at least one of p0 and alpha, among others. The parameter "p0" may refer to target receive power and "alpha" may refer to compensation coefficient of PL. A closed loop configuration may refer to a closed loop power adjustment (state) (also referred herein as a "closed loop").

The present disclosure is directed to systems, methods, and apparatuses to determine the beam formation, PC information or port information of UL channel or signal, among others. A UE can determine first information in a first CC according to a beam state in a second CC. The first information may include at least one of a sounding reference signal (SRS) resource, a SRS resource set, a PL-RS of UL signal, a p0 of UL signal, an alpha of UL signal and a closed loop of UL signal. The first CC and the second CC can be the same or different CC.

In addition, the UE can determine second information of UL signal in the first CC according to the first information in the first CC. The second formation may include at least one of beam, PC information and port information. Further, the first CC may belong a first CC group, the second CC may belong a second CC group. The first CC group and the second CC group can be the same or different CC group. In some embodiments, the second CC may satisfy at least one of the following characteristics: (i) the second CC as a primary cell (PCell); (ii) the second CC as the CC having the lowest or highest CC index in the second CC group; and (iii) the second CC as configured by an RRC signaling (e.g., the index of second CC as indicated by an RRC signaling directly).

In some embodiments, the beam state can include at least one of an active state, a (predefined, pre-specified or indicated) Mth beam state in N active beam states or (predefined, pre-specified or indicated) P beam states in N active beam states. Specifically, the active beam state(s) can be activated or indicated by a activation command, such as a MAC-CE or downlink control information (DCI). These activation commands can be transmitted in the second CC or the first CC.

In some embodiments, the UE can determine the first information in the first CC according to third information associated with the beam state in the second CC. The third information can include at least one of a SRS resource identifier/index (ID), a SRS resource set ID, a third offset, a PL-RS, a first offset, a PL-RS ID, a second offset, a p0, a p0 ID, an alpha or a closed loop, among others. Specifically, these elements (e.g., SRS resource ID) can be configured in a beam state through a command signaling (e.g., RRC or MAC-CE). In some embodiments, the index of a beam state (e.g., TCI state ID) can be configured in a SRS resource.

In some embodiments, the UE can determine the first information in the first CC according to the first information in the second CC associated with the beam state in the second CC. The UE can determine the first information in the second CC according to the beam state in the second CC, and the UE can determine the first information in the first CC according to the first information in the second CC. Specifically, the first information in the first CC may be associated with the first information in the second CC.

In some embodiments, the UE can determine fourth information associated with the first information in the first CC according to the fourth information associated with the first information in the second CC. The fourth information can include at least one of a SRS resource ID, a SRS resource set ID, usage, number of port, PL-RS, PL-RS ID, p0, alpha, or closed loop, among others. For example, the SRS resource ID of the SRS resource in the first CC can be associated with (e.g., is equal to) the SRS resource ID of the SRS resource in the second CC. In some embodiments, usage (e.g., function, purpose) of the SRS resource can include at least one of non codebook (NCB), codebook (CB) or antenna switching. In some embodiments, the UL signal can include at least one of a PUSCH, PUCCH or a SRS.

Figure 3:
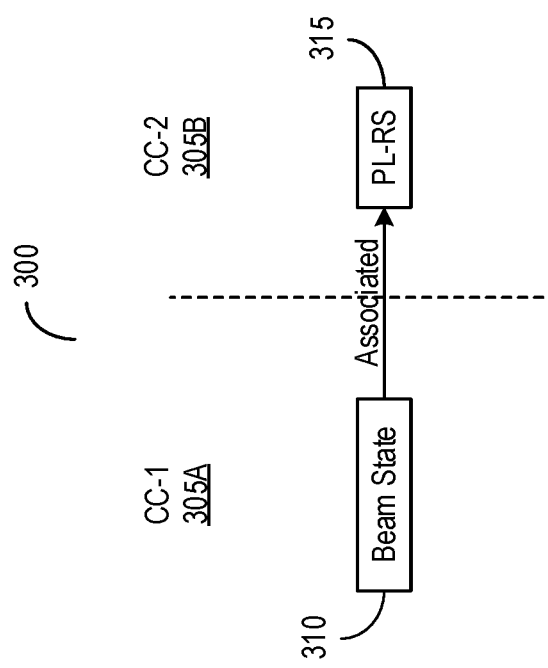
FIG. 3 illustrates a block diagram of an example configuration between two component carriers (CCs) to determine power control (PC) information using a single beam state in accordance with an illustrative embodiment.

Referring now to FIG. 3, depicted is a block diagram of a configuration 300 between CC-1 305A (also referred herein as second CC) and CC-2 305B (also referred herein as first CC) using a single beam state 310 to determine PC information (e.g., PL-RS 315). As illustrated, the UE can determine the PC information (e.g., PL-RS) in the first CC (e.g., CC-2) according to the beam state (e.g., TCI state) in the second CC (e.g., CC-1).

In CA deployment, the UE may establish connections with CC-1 305A and CC-2 305B. The CC-1 305A may be a PCell, and CC-1 305A and CC-2 305B can belong to the same CC group. At a given time instant, the gNodeB can activate or indicate a TCI state (e.g., an active TCI state) in CC-1 305A for the UE through a control signaling (e.g., MAC-CE or DCI). The TCI state can include/indicate a PL-RS. Specifically, the PL-RS can be a periodic CSI-RS or SSB, assumed to be CSI-RS 3. When the UE receives the control signaling, the UE can determine the PL-RS of the UL channel or signal in CC-2 305B according to (the PL-RS configured in) the TCI state in CC-1 305A (e.g., CSI-RS 3). Further, the UE can calculate DL pathloss in CC-2 305B by using CSI-RS 3.

In some embodiments, the TCI state can include a CSI-RS resource (or SSB) ID and an first offset. The first offset can correspond to the difference between a target CSI-RS resource (or SSB) ID and the CSI-RS resource (or SSB) ID. The UE can determine the corresponding PL-RS (e.g., the target CSI-RS resource) of the UL channel or signal in CC-2 305B. For example, if the TCI state in CC-1 305A includes CSI-RS resource ID=1 and first offset=2, the UE can determine the corresponding PL-RS (e.g., CSI-RS resource ID=3) in CC-2 305B.

In some embodiments, the TCI state can also include an index of PL-RS (also called as PL-RS ID), such as PL-RS ID=1. The UE can find the corresponding PL-RS of the UL channel or signal in CC-2 305B according to a PL-RS list (or set) in CC-2 305B configured by a control signaling (e.g., RRC or MAC-CE). The PL-RS list can be applicable to PUSCH, PUCCH or SRS in CC-1 305A, CC-2 305B or CC-1 305A and CC-2 305B. The PL-RS list can also be applicable to all UL channels or signals in CC-1 305A, CC-2 305B or CC-1 305A and CC-2 305B.

In some embodiments, the TCI state can also include a PL-RS ID (as a reference PL-RS ID) and an second offset. The second offset can correspond to the difference between a target PL-RS ID and the reference PL-RS ID. The UE can find the corresponding PL-RS (e.g., target PL-RS) of the UL channel or signal in CC-2 305B according to a PL-RS list (above mentioned) in CC-2 305B. For example, if the TCI state in CC-1 305A includes PL-RS ID=1 and second offset=2, the UE can determine the corresponding PL-RS (e.g., PL-RS ID=3) in CC-2 305B.

Figure 4:
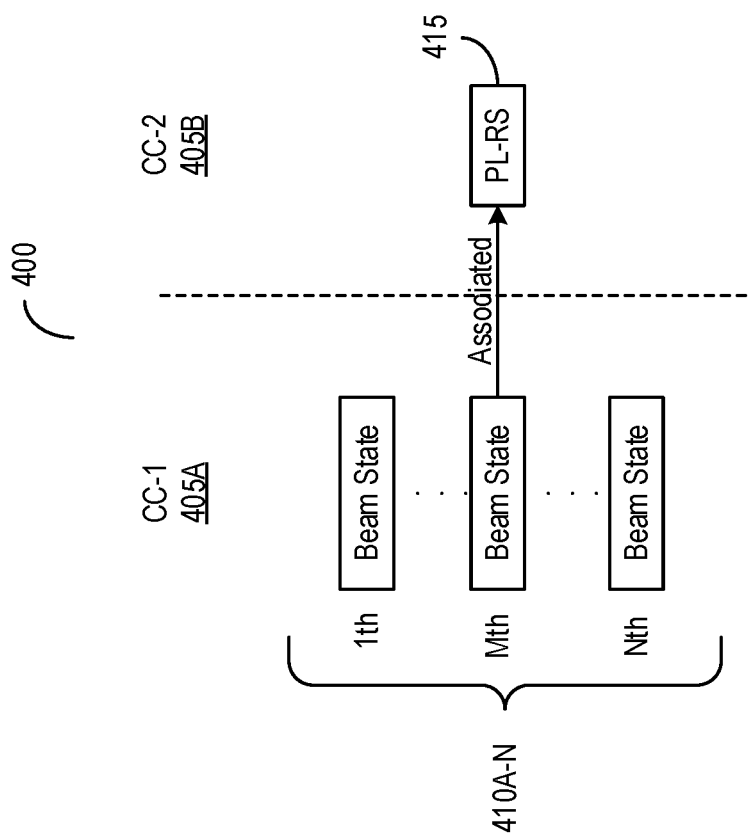
FIG. 4 illustrates a block diagram of an example configuration between two component carriers (CCs) to determine power control (PC) information using multiple beam states in accordance with an illustrative embodiment.

Referring now to FIG. 4, depicted is a block diagram of a configuration 400 between CC-1 405A (also referred herein as second CC) and CC-2 405B (also referred herein as first CC) using a set of beam states 410A-N to determine PC information (e.g., PL-RS 415). In some embodiments, multiple TCI states may be activated or indicated in CC-1 405A at a given time instant. For example, in a multiple TRP (transport/transmit receive point) scenario, multiple TRPs may be deployed in CC-1 405A and connected with the UE. In this case, multiple TCI states may be activated or indicated in CC-1 405A at a given time instant, assuming that N TCI states are activated. As illustrated, the UE may determine the PL-RS 415 of UL channel or signal in CC-2 405B according to the Mth TCI state in CC-1 405A, where M is a positive integer and lower than or equal to N.

Figure 5:
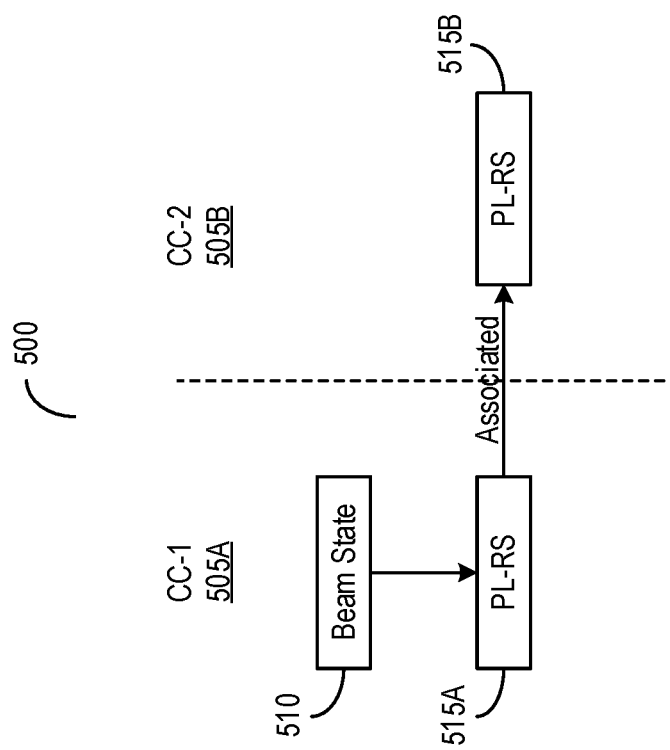
FIG. 5 illustrates a block diagram of an example configuration between two component carriers (CCs) to determine power control (PC) information for one CC using the PC information of another CC in accordance with an illustrative embodiment.

Referring now to FIG. 5, depicted is a block diagram of a configuration 500 between CC-1 505A (also referred herein as second CC) and CC-2 505B (also referred herein as first CC) using a beam state 510 of the CC-1 505A to determine PC information (e.g., PL-RS 515A) for the same CC-1 505A and PC information (e.g., PL-RS 515B) for the other CC-2 505B. In CA deployment, the UE may establish connections with CC-1 505A and CC-2 505B. The CC-1 505A may be a PCell, and CC-1 505A and CC-2 505B may belong to the same CC group. The UE can determine the PL-RS of the UL channel or signal in CC-2 505B according to the PL-RS of the UL channel or signal in CC-1 505A (see FIG. 3). The PL-RS of the UL channel or signal in CC-1 505A may be determined according to the activated or indicated TCI state in CC-1 505A (above mentioned). Specifically, the PL-RS in CC-2 505B can be the same as the PL-RS in CC-1 505A. In some embodiments, the index of PL-RS (PL-RS ID) in CC-2 505B can be the same as the index of PL-RS in CC-1 505A. The UE can find the corresponding PL-RS according to the determined PL-RS ID and a PL-RS list (above mentioned) in CC-2 505B. Further, to guarantee that the UE can find the PL-RS in CC-2 505B, at least one PL-RS with the same PL-RS ID may be configured for CC-1 505A and CC-2 505B through RRC signaling. Additionally, except for PL-RS, the two examples mentioned above can also be applicable to other PC parameters, e.g., p0, alpha, closed loop (e.g., PC adjustment state).

Figure 6:
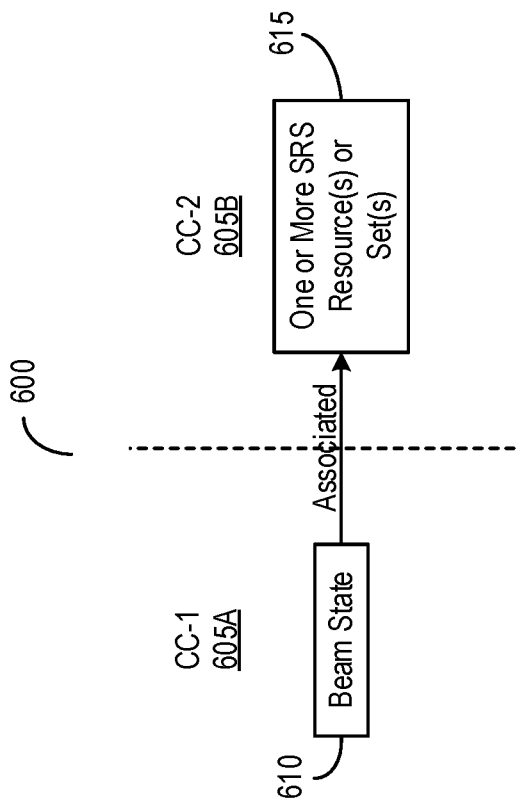
FIG. 6 illustrates a block diagram of an example configuration between two component carriers (CCs) to determine sounding reference signal (SRS) resources or sets using a single beam state in accordance with an illustrative embodiment.

Referring now to FIG. 6, depicted is a block diagram of a configuration 600 between CC-1 605A (also referred herein as second CC) and CC-2 605B (also referred herein as first CC) using a beam state 610 of the CC-1 605A to determine SRS resource or SRS resource sets 615. As illustrated, the UE may determine the SRS resource or SRS resource set in the first CC (e.g., CC-2 605B) according to the beam state (e.g., TCI state) in the second CC (e.g., CC-1 605A).

For an example, in CA deployment, the UE may establish connections with CC-1 605A and CC-2 605B. The CC-1 605A may be PCell, and CC-1 605A and CC-2 605B belong to the same CC group. At a given time instant, the gNodeB may activate or indicate a TCI state in CC-1 605A for the UE through a control signaling (e.g., MAC-CE or DCI). The TCI state can include at least one index of SRS resource (called as SRS resource ID). When the UE receives the control signaling, the UE can determine the corresponding SRS resource(s) in CC-2 605B. Furthermore, after the UE receives a DCI including a SRS request indicator (SRI) field and scheduling a PUSCH transmission, the SRI field may be used to select one or more SRS resource(s) form the determined SRS resource(s). The UE can determine the beam and (antenna) port applied for the PUSCH transmission according to the selected SRS resource(s).

In some embodiments, the TCI state can also include at least one index of SRS resource set (called as SRS resource set ID). When the UE receives the control signaling above mentioned, the UE can determine the corresponding SRS resource set (s) in CC-2 605B. Further, after the UE receives a DCI including a SRI field and scheduling a PUSCH transmission, the SRI field may be used to select one or more SRS resource(s) form the determined SRS resource set(s). The UE can determine the beam and (antenna) port applied for the PUSCH transmission according to the selected SRS resource(s).

In some embodiments, except for the SRS resource ID or the SRS resource set ID, the TCI state can also include at least one third offset. The third offset may correspond to the difference between a target SRS resource (or SRS resource set) ID and the reference SRS resource (or SRS resource set) ID. For example, if the TCI state in CC-1 605A includes SRS resource ID=1 and third offset=2, the UE can determine the corresponding SRS resource (i.e., SRS resource ID=3) in CC-2 605B.

Figure 7A:
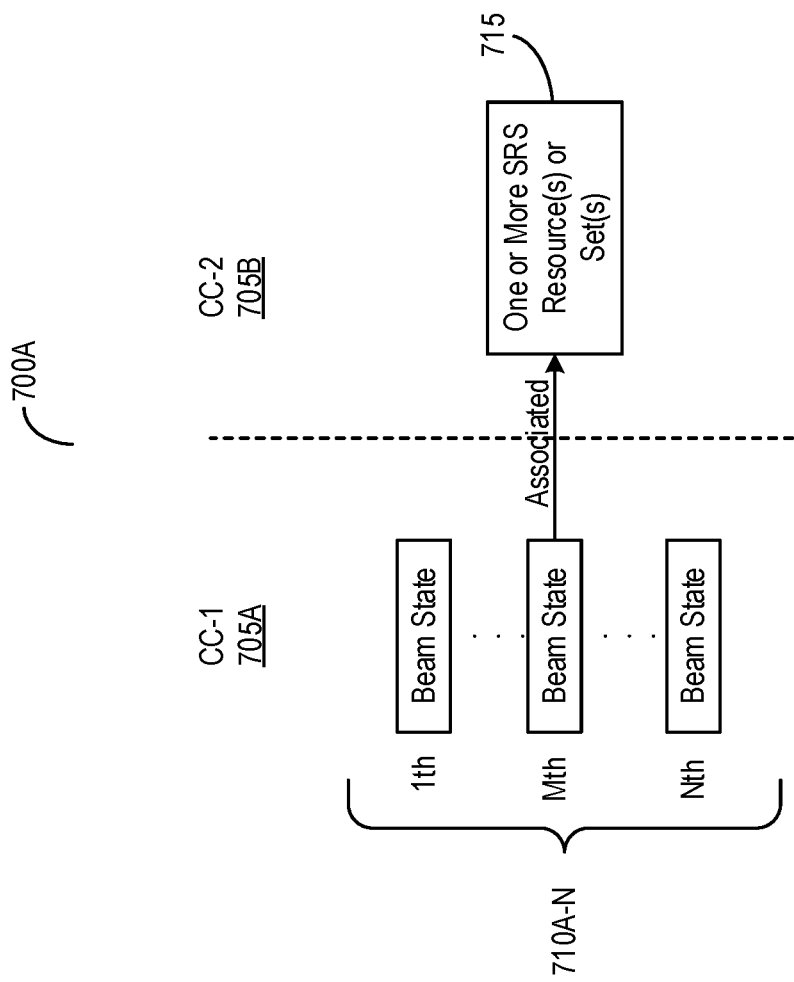
FIG. 7A illustrates a block diagram of an example configuration between two component carriers (CCs) to determine sounding reference signal (SRS) resources or sets using multiple beam states in accordance with an illustrative embodiment.
Figure 7B:
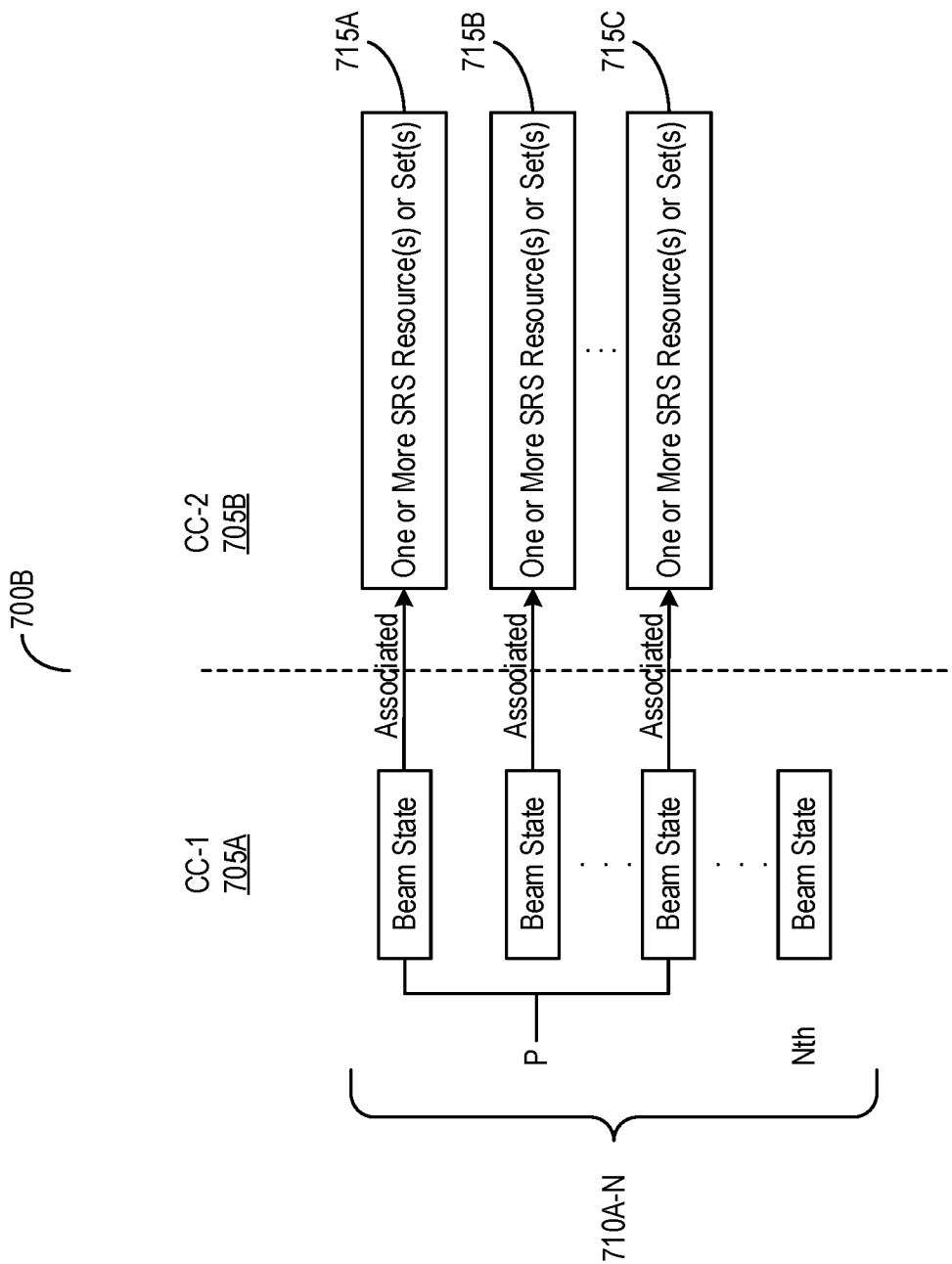
FIG. 7B illustrates a block diagram of an example configuration between two component carriers (CCs) to determine multiple sounding reference signal (SRS) resources or sets using multiple beam states in accordance with an illustrative embodiment.

Referring now to FIG. 7A, depicted is a block diagram of a configuration 700A between CC-1 705A (also referred herein as second CC) and CC-2 705B (also referred herein as first CC) using a set of beam states 710A-N to determine at least one SRS resource or SRS resource sets 715. Referring also to FIG. 7B, depicted is a block diagram of a configuration 700A between CC-1 705A (also referred herein as second CC) and CC-2 705B (also referred herein as first CC) using the set of beam states 710A-N to determine a plurality of SRS resources or SRS resource sets 715A-N. In some embodiments, multiple TCI states may be activated or indicated in CC-1 705A at a given time instant. For example, in a multiple TRP scenario, multiple TRPs may be deployed in CC-1 705A and connected with the UE. In this case, multiple TCI states may be activated or indicated in CC-1 705A at a given time instant, assuming that N TCI states are activated. The UE may determine the SRS resource or SRS resource set in CC-2 705B according to the Mth TCI state (shown in configuration 700A) or P TCI states (as shown in configuration 700B) in CC-1 705A, wherein M or P is a positive integer and lower than or equal to N.

Figure 8:
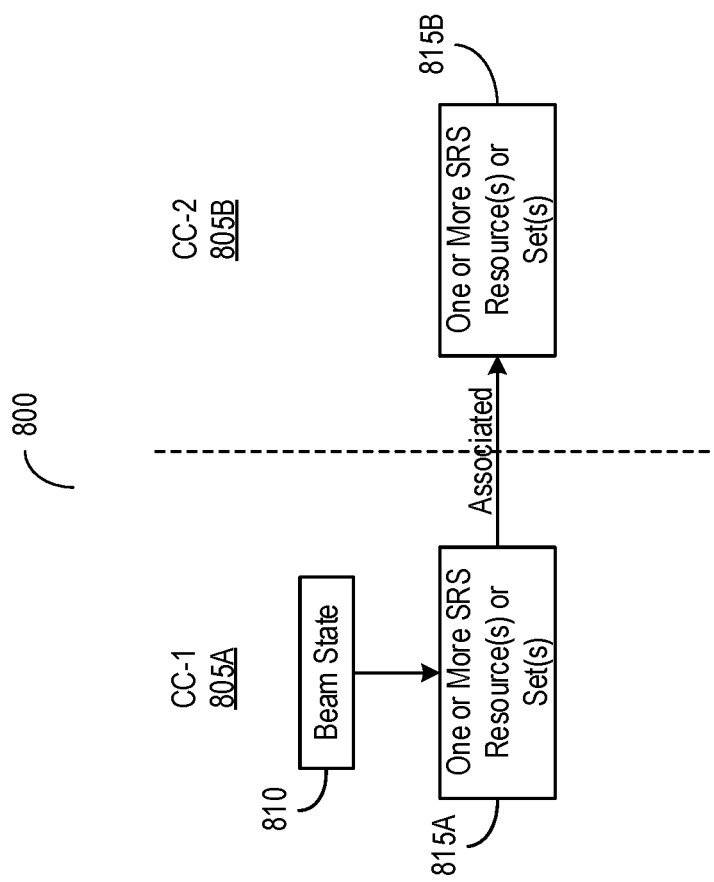
FIG. 8 illustrates a block diagram of an example configuration between component carriers (CCs) to determine sounding reference signal (SRS) resources or sets for one CC using the SRS resources or sets for another CC in accordance with an illustrative embodiment.

Referring now to FIG. 8, depicted is a block diagram of a configuration 800 between CC-1 805A (also referred herein as second CC) and CC-2 805B (also referred herein as first CC) using a beam state 810 of one CC-1 805A to determine a SRS resource or SRS resource sets 815A of the same CC-1 805A and SRS resource or SRS resource sets 815B of the other CC-2 815B. In CA deployment, the UE may establish connections with CC-1 805A and CC-2 805B. The CC-1 805A may be PCell, and CC-1 805A and CC-2 805B may belong to the same CC group. The UE can determine the SRS resource or SRS resource set in CC-2 805B according to the SRS resource set in CC-1 805A. The SRS resource or SRS resource set in CC-1 805A may be determined according to the activated or indicated TCI state(s) in CC-1 805A (above mentioned). Specifically, the SRS resource ID or SRS resource set ID in CC-2 805B can be the same as the SRS resource ID or SRS resource set ID in CC-1 805A.

In some embodiments, the beam (e.g., spatial RS of SRS resource) of SRS resource (or the SRS resource belonging to the SRS resource set) in CC-2 805B can be the same as the beam of SRS resource in CC-1 805A. Additionally, the usage of the SRS resource set (or the SRS resource set including the SRS resource) in CC-2 805B can be the same as the usage of the SRS resource set in CC-1 805A, and the number of port of SRS resource (or the SRS resource belonging to the SRS resource set) in CC-2 805B can be the same as the number of port of the SRS resource in CC-1 805A. Further, to guarantee that the UE can find the SRS resource or SRS resource set in CC-2 805B, at least one SRS resource or SRS resource set with the same SRS resource ID or SRS resource set ID may be configured for CC-1 805A and CC-2 805B through RRC signaling. In addition, at least one SRS resource or SRS resource set with the same beam, usage and/or port number may be configured for CC-1 805A and CC-2 805B through RRC signaling.

Figure 9:
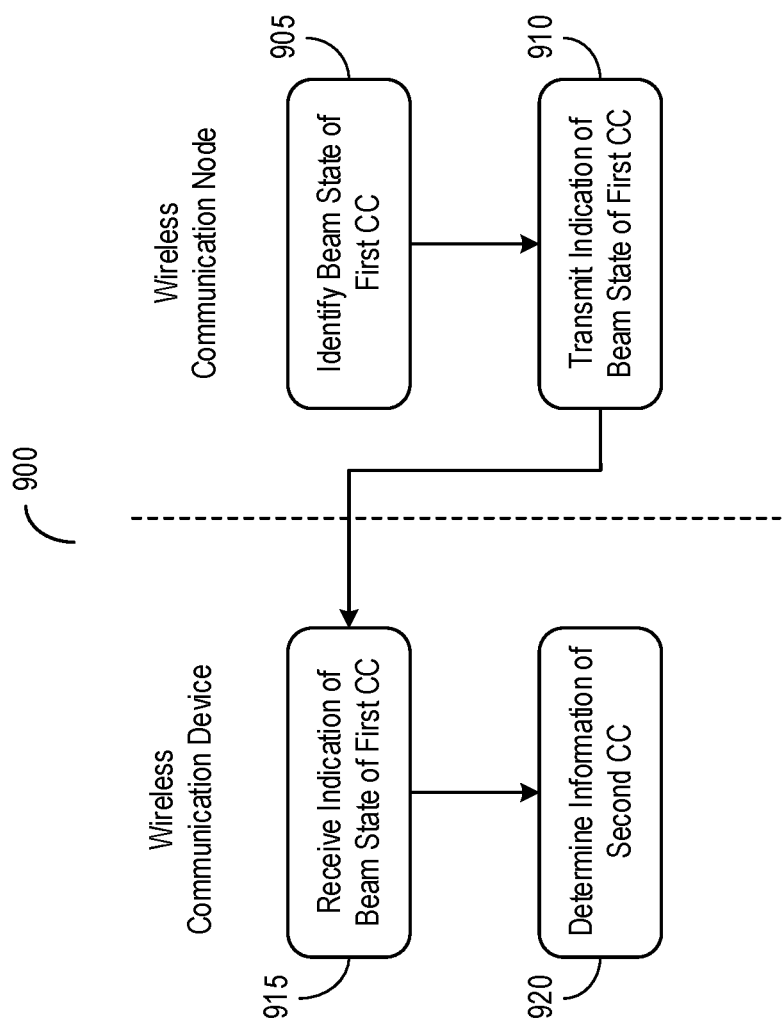
FIG. 9 illustrates a flow diagram of a method of determining information of beam forming information across component carriers (CCs) in accordance with an illustrative embodiment.

Referring now to FIG. 9, depicted is a flow diagram of a method 900 of determining information of component carriers (CCs). The method 900 may be implemented using or performed by one or more components detailed herein, such as BS 102 or UE 104. In brief overview, a wireless communication node may identify a beam state of a first component carrier (CC) (905). The wireless communication node may transmit an indication of the beam state of the first CC (910). A wireless communication device may receive the indication of the beam state of the first CC (915). The wireless communication device may determine information of a second CC (920).

In further detail, a wireless communication node (e.g., BS 102) may determine or identify a beam state of a first component carrier (CC) (e.g., CC-1 305A, 405A, 505A, 705A, and 805A) (905). The CC may refer to a corresponding carrier in an aggregation of carrier of uplink (UL) or downlink (DL) resources. The first CC may include or correspond to a primary cell (PCell), a CC having a particular CC index (e.g., the lowest CC index or the highest CC index) in a CC group, or a CC configured via radio resource signal (RRC) signaling, among others. The beam state may specify, define, or identify one or more parameters for configuring or controlling beamforming, beam steering, beam switching for a channel (e.g., uplink (UP) or downlink (DL channel) or a signal. The parameters of the beam state may identify or include a quasi-co-location (QCL) state, QCL assumption, a reference signal (RS), transmission configuration indicator (TCI) state, or spatial relation information, among others.

The beam state of the first CC may be initiated, triggered, or otherwise activated. The activation of the beam state of the first CC may be via a media access control, control element (MAC CE) or downlink control information (DCI) signaling, among others. In some embodiments, the beam state of the first CC may include or correspond to an activated beam state. The beam state may include or correspond to the only-activated beam state (e.g., beam state 310), an M-th beam state from N-activated beam states (e.g., beam state 410M from set of beam states 410A-N), or P beam states from N activated beam states (e.g., selecting a subset from the total set of beam states 710A-N). The indexes, M, N, and P, for the beam states may be positive integer values.

The wireless communication node may send, provide, or transmit an indication of the beam state of the first CC to a wireless communication device (e.g., UE 104) (910). The indication of the beam state may define, correspond to, or identify the one or more parameters for configuring or controlling the beamforming, beam steering, beam switching for the channel or signal in the first CC as detailed above. The wireless communication device may retrieve, identify, or otherwise receive the indication of the beam state of the first CC from the wireless communication node (915). In some embodiments, the wireless communication device may establish a connection with one or more CCs, including the first CC. The establishment of the connection may be in accordance with RRC signaling or DCI signaling.

The wireless communication device may generate, identify, or determine information of a second CC (e.g., CC-2 305B, 405B, 505B, 605B, 705B, and 805B) (920). The determination of the information of the second CC may be in accordance with the beam state of the first CC. In some embodiments, the first CC and the second CC may be of the same CC or different CC. In some embodiments, the first CC may belong to a first CC group and the second CC may belong to a second CC group. The second CC group may be the same or different from the first CC group. In determining, the wireless communication device may derive the information of the second CC from the beam state of the first CC. In some embodiments, the wireless communication device may determine the information of the second CC in accordance with information associated with the beam state of the first CC. The information of the second CC may include parameters derived from the information (e.g., the parameters) of the beam state of the first CC.

In some embodiments, the wireless communication device may determine information of the second CC of a first information type in accordance with information of the first CC of the same first information type associated with the beam state of the first CC. The first information type can include at least one of: a sounding reference signal (SRS) resource, a SRS resource set, a path-loss reference signal (PL-RS), a p0, an alpha, or a closed loop. The first type of information may differ from a second type of information. For example, the first type of information may be beam state parameters and the second type of information may be reference signal (RS) parameters. In some embodiments, the wireless communication device may determine information of the second information type associated with the information of the first information type of the second CC. The determination of the information of the second information type may be in accordance with the information of the second information type associated with the information of the first information type of the first CC. The information of the second information type may comprise at least one of: an identifier (ID) of the SRS resource or the SRS resource set, the PL-RS, an ID of the PL-RS, the P0, the alpha, or the closed loop. For example, the wireless communication device may use the beam state information of the first CC to determine SRS resources for the first CC. Using the SRS resources of the first CC, the wireless communication device may derive the SRS resources of the second CC.

In some embodiments, the information of the second CC may identify or include parameters related to reference signals (RSs). For example, the information of the second CC may include or identify a sounding resource signal (SRS) resource, a SRS resource set, a SRS resource identifier, a SRS resource set identifier, or one or more offsets, among others (e.g., SRS resources or sets 615, 715A, 715B, and 815). The SRS resource may correspond to a resource used in transmitting SRS from the wireless communication device via an uplink communication to the wireless communication node. The SRS set may identify or include one or more SRS resources. The SRS resource identifier may reference or correspond to a particular SRS resource. The SRS resource set identifier may reference or correspond to a particular SRS resource set. The offset may correspond to a difference between a target SRS resource identifier and a reference SRS resource identifier or a difference between a target SRS resource set identifier and a reference SRS resource set identifier. In some embodiments, the information of the second CC may include or identify usage of the SRS resource or SRS resource set, among others. The usage of the SRS resource or the SRS resource set may identify or include non-codebook (NCB), codebook (CB), or antenna switching usage, among others. A NCB usage may include, describe or identify an association with a precoding matrix for beamforming that is determined in accordance with channel state information. A CB usage may include, describe or identify usage in association with a CB which may describe a precoding matrix indicator (PMI) for beamforming. The antenna switching usage may include, describe or identify usage in association with antenna switching which may identify or determine antenna elements to be used for beam control.

In some embodiments, the information of the second CC may identify or include parameters related to power control (PC) and by extension path loss (PL). For example, the information of the second CC may identify or include a path-loss reference signal (PL-RS) (e.g., PL-RS 315 and 415), a PL-RS identifier, one or more offsets. The PL-RS may correspond to or be the reference signal used to measure the path loss in the uplink communication with the wireless communication node. The PL-RS identifier may reference or correspond to a particular PL-RS. The offset may correspond to a difference between a target PL-RS identifier and the reference PL-RS identifier. In addition, the information of the second CC may also include or identify parameters related to the signals used to measure path loss. For example, the information of the second CC may identify or include p0, p0 identifier, an alpha, and a closed loop, among others. The parameter p0 may correspond to a target receive power. The parameter p0 identifier may reference a particular p0 parameter. The parameter alpha may correspond to a compensation coefficient for the path-loss. The parameter closed loop may indicate whether to adjust for closed loop power.

In some embodiments, the wireless communication device may determine information of an uplink (UL) signal in the second CC according to the information of the second CC, wherein the information of the uplink signal includes at least one of: port information or power control information. With the determination of the information of the second CC, the wireless communication device may determine the information of the UL signal in the second CC. The information of the UL signal may be used to configure the UL signal to be sent to the wireless communication node. In some embodiments, the UL signal may include a physical uplink shared channel (PUSCH), a physical uplink control channel (PUCCH), or an SRS, among others. The wireless communication device may send the UL signal in accordance with the information to measure path loss.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution. Furthermore, "A is associated with B" means that A and B have an direct or indirect relationship. It means that A (or B) can be determined according to B (or A).

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method, comprising:
receiving, by a wireless communication device from a wireless communication node, an indication of a transmission configuration indicator (TCI) state of a first component carrier (CC); and
determining, by the wireless communication device, a pathloss reference signal (PL-RS) for an uplink signal in a second CC according to a PL-RS identifier associated with the TCI state of the first CC and a PL-RS list configured by control signaling in the second CC; and
determining, by the wireless communication device, power control information of the uplink signal in the second CC according to power control information in an open loop configuration and closed loop configuration associated with the TCI state of the first CC,
wherein the power control information in the open loop configuration comprises at least one of a p0 corresponding to a target receive power, or an alpha corresponding to a compensation coefficient for path loss, and
wherein the power control information in the closed loop configuration indicates a closed loop power adjustment state.

2. The method of claim 1, wherein the first CC and the second CC are a same CC or different CCs.

3. The method of claim 1, wherein the uplink signal includes at least one of a physical uplink shared channel (PUSCH), a physical uplink control channel (PUCCH), or a sounding reference signal (SRS).

4. The method of claim 1, wherein the first CC belongs to a first CC group, and the second CC belongs to a second CC group which is same as or different from the first CC group.

5. The method of claim 1, wherein the first CC comprises at least one of:
- a primary cell (PCell),
- a CC having a lowest or highest CC index in a CC group, or
- a CC configured via a radio resource control (RRC) signaling.

6. The method of claim 1, wherein the TCI state of the first CC comprises an only activated TCI state, an M-th TCI state from N activated TCI states, or P TCI states out of the N activated TCI states, where M, N and P are integer values.

7. The method of claim 6, wherein the TCI state of the first CC is activated via a medium access control control element (MAC CE) or downlink control information (DCI) signaling.

8. A method, comprising:
- transmitting, by a wireless communication node to a wireless communication device, an indication of a transmission configuration indicator (TCI) state of a first component carrier (CC); and
- causing, by the wireless communication node, the wireless communication device to determine a pathloss reference signal (PL-RS) for an uplink signal in a second CC according to a PL-RS identifier associated with the TCI state of the first CC and a PL-RS list configured by control signaling in the second CC; and
- causing the wireless communication device to determine power control information of the uplink signal in the second CC according to power control information in an open loop configuration and closed loop configuration associated with the TCI state of the first CC,
- wherein the power control information in the open loop configuration comprises at least one of a p0 corresponding to a target receive power, or an alpha corresponding to a compensation coefficient for path loss, and
- wherein the power control information in the closed loop configuration indicates a closed loop power adjustment state.

9. The method of claim 8, wherein the first CC and the second CC are a same CC or different CCs.

10. The method of claim 8, wherein the uplink signal includes at least one of a physical uplink shared channel (PUSCH), a physical uplink control channel (PUCCH), or a sounding reference signal (SRS).

11. A wireless communication device, comprising:
at least one processor configured to:
- receive, via a receiver from a wireless communication node, an indication of a transmission configuration indicator (TCI) state of a first component carrier (CC); and
- determine a pathloss reference signal (PL-RS) for an uplink signal in a second CC according to a PL-RS identifier associated with the TCI state of the first CC and a PL-RS list configured by control signaling in the second CC; and
- determine power control information of the uplink signal in the second CC according to power control information in an open loop configuration and closed loop configuration associated with the TCI state of the first CC,
- wherein the power control information in the open loop configuration comprises at least one of a p0 corresponding to a target receive power, or an alpha corresponding to a compensation coefficient for path loss, and
- wherein the power control information in the closed loop configuration indicates a closed loop power adjustment state.

12. A wireless communication node, comprising:
at least one processor configured to:
- transmit, via a transmitter to a wireless communication device, an indication of a transmission configuration indicator (TCI) state of a first component carrier (CC); and
- cause the wireless communication device to determine a pathloss reference signal (PL-RS) of an uplink signal in a second CC according to a PL-RS identifier associated with the TCI state of the first CC and a PL-RS list configured by control signaling in the second CC; and
- cause the wireless communication device to determine power control information of the uplink signal in the second CC according to power control information in an open loop configuration and closed loop configuration associated with the TCI state of the first CC,
- wherein the power control information in the open loop configuration comprises at least one of a p0 corresponding to a target receive power, or an alpha corresponding to a compensation coefficient for path loss, and
- wherein the power control information in the closed loop configuration indicates a closed loop power adjustment state.

* * * * *